UNITED STATES PATENT OFFICE.

CHARLES SCHAEFFER, OF WASHINGTON, DISTRICT OF COLUMBIA, ASSIGNOR TO FARDINAND LAMBRECHT, OF SAME PLACE.

IMPROVEMENT IN ARTIFICIAL MARBLE.

Specification forming part of Letters Patent No. 193,041, dated July 10, 1877; application filed June 15, 1877.

*To all whom it may concern:*

Be it known that I, CHARLES SCHAEFFER, of Washington city, in the District of Columbia, have invented certain new and useful Improvements in Cement Pavements, of which the following is a specification:

My invention relates to certain improvements in artificial stone, its object being to produce slabs or tiles having a variegated surface, susceptible of a high polish and finish, for the construction of pavements, floors, mantels, and other like uses to which ornamental stones are commonly applicable.

To this end my invention consists in an improved method of forming such slabs or tiles, having a variegated surface, which method consists in placing stones of various colors and descriptions, preferably flat on one side, upon the bottom of a suitably-shaped mold, and covering the same with a composition of hydraulic cement and silicate of soda, in proper proportions to form the facing of the slab or tile to a suitable depth, after which a backing composed of hydraulic cement, sand, and silicate of soda is formed on the back of said facing by filling in upon the same in the mold a composition of hydraulic cement, sand, and silicate of soda, as more fully hereinafter set forth.

In carrying out my invention, I take a mold corresponding to the shape of the slab or tile to be produced, and on the bottom of this mold I arrange any suitable number of fragments of marble or other stone capable of taking a fine polish, the fragments preferably being of different colors, and varying in size according to the appearance to be produced upon the surface of the finished slab.

Such fragments are generally chosen as have one flat or plane surface, in preference to more irregular fragments, each fragment resting on said flat or plain surface when placed in the mold, in order to do away with excessive grinding in finishing the face of the slab.

After the fragments have been suitably arranged within the mold, I take a quantity of finely-pulverized hydraulic cement, and mix with it a solution of two (2) parts of silicate of soda in ninety-eight (98) parts of water, until a mass of a sirupy consistence is formed. This composition is poured upon the fragments until they are covered, or nearly so. The mold is then filled up with a mixture of sand and one part of hydraulic cement brought to proper consistence by means of water.

After the mixture has set, the slabs or tiles are removed from the mold and left to dry, either in the open air or in a room at a temperature of not less than 60°.

The face of the block or slab thus formed is susceptible of a high polish, enabling me to produce beautiful tiles of any desired form, mantels, table-tops, or other articles of a similar nature with great economy.

What I claim, and desire to secure by Letters Patent, is—

1. The method of forming slabs, tiles, or other articles of artificial stone having a variegated surface, by arranging fragments of marble of various sizes and colors in a mold, covering said fragments with a composition of hydraulic cement and silicate of soda or potash, backing the same with a composition of hydraulic cement and sand, and allowing the whole to set and dry, substantially as herein set forth.

2. An artificial stone composed of a body of hydraulic cement, mixed with silicate of potash or soda, a back of cement and sand, and a facing of dust of marble or other stone, covered with a thin layer of a mixture of finely-pulverized cement and silicate of potash or soda, substantially as herein set forth.

In testimony that I claim the foregoing I have hereunto set my hand this 13th day of June, A. D. 1877.

CHARLES SCHAEFFER.

Witnesses:
ALBERT H. NORRIS,
JAMES A. RUTHERFORD.